United States Patent [19]

Neuberger

[11] Patent Number: 5,602,947
[45] Date of Patent: Feb. 11, 1997

[54] ANTI-REFLECTIVE MID-INFRARED OPTICAL FIBER AND MICRO OPTICAL COMPONENTS

[75] Inventor: Wolfgang Neuberger, F. T. Labuan, Malaysia

[73] Assignee: Ceram Optee Industries, Inc., East Long Meadow, Mass.

[21] Appl. No.: 610,409

[22] Filed: Mar. 4, 1996

Related U.S. Application Data

[63] Continuation-in-part of Ser. No. 368,909, Jan. 5, 1995, abandoned.

[51] Int. Cl.⁶ .................................................. G02B 6/26
[52] U.S. Cl. ............................................ 385/31; 359/622
[58] Field of Search .......................... 385/31, 33, 34, 385/123, 126; 359/619, 622, 663, 619, 742, 419, 422, 435, 744, 642; 252/186.43, 582, 584; 372/6, 19, 29, 94; 356/350, 128, 130, 361

[56] References Cited

U.S. PATENT DOCUMENTS

| | | | |
|---|---|---|---|
| 4,549,781 | 10/1985 | Bhagavatula et al. | 385/126 |
| 4,715,679 | 12/1987 | Bhagavatula et al. | 385/127 |
| 4,753,521 | 6/1988 | Deserno | 359/663 |
| 4,867,521 | 9/1989 | Mallinson | 385/34 |
| 5,035,478 | 7/1991 | Ishikawa et al. | 252/186.43 |
| 5,166,949 | 11/1992 | Perlmutter | 372/19 |
| 5,270,859 | 12/1993 | Wirth et al. | 359/622 |
| 5,291,334 | 3/1994 | Wirth et al. | 359/622 |
| 5,422,714 | 6/1995 | Fladd | 356/128 |
| 5,436,764 | 7/1995 | Umetani et al. | 359/619 |

OTHER PUBLICATIONS

Artjushenko et al. "Mechanisms of Optical Losses in Polycrystalline Fibers" SPIE Pro. vol. 1591, (1991) 7 pages.

*Primary Examiner*—Akm E. Ullah
*Attorney, Agent, or Firm*—Bolesh J. Skutnik

[57] ABSTRACT

An interface between a surface of a micro optical component, and a second medium of different refractive index can be made substantially non-reflective, thereby eliminating Fresnel reflection losses for a predetermined wavelength at its surfaces, by including micro voids within the component surface. The volume fraction of voids required to eliminate the Fresnel reflection losses, $v_1$, is: $v_1=[n_2-(n_m n_2)^{1/2}]/[n_2-n_1]$, where $n_1$ is the refractive index of the void, $n_m$ is the refractive index of the medium surrounding the fiber tip, $n_2$ is the refractive index of the optical component material, and $v_2$ is its volume fraction in the modified surface section. The thickness, t, of the layer of lower refractive index material required at the component surface is $2N t \cos \theta = \lambda_o/2$, where $\lambda_o$ is the predetermined wavelength for total cancellation by interference, $\theta$ is the angle of incidence, and $N=(n_m n_2)^{1/2}$, where $n_2$, is the refractive index of the component material and $n_m$ is the refractive index of the medium in contact with the component surface. At least one dimension of the micro void in the surface plane interfacing the second medium must be not greater than half the predetermined wavelength.

16 Claims, 4 Drawing Sheets

1

ANTI-REFLECTIVE MID-INFRARED OPTICAL FIBER AND MICRO OPTICAL COMPONENTS

REFERENCE TO RELATED CASE

This application is a continuation-in-part of U.S. patent application Ser. No. 08/368,909 filed on Jan. 5, 1995 now abandoned, by Wolfgang Neuberger, inventor, entitled "ANTIREFLECTIVE MID-INFRARED OPTICAL FIBER", and incorporated by reference herein.

BACKGROUND OF THE INVENTION

1. Field of the Invention

This invention relates to optical components such as optical fibers for the transmission of mid-infrared ("IR") spectral wavelengths, such as from CO and $CO_2$ lasers, for high power applications and, more generally, for sensing applications such as sensing near-ambient temperatures, and for molecular spectroscopy. In particular the present invention provides a new approach for creating antireflective surfaces for micro optical components and for the input and output ends of optical fibers used in these applications

2. Information Disclosure Statement

Mid-IR fibers cover the spectral range from 4 µm to 20 µm. [See e.g. V. G. Artjushenko, et al, "Mechanism of Optical Losses in Polycrystalline Fibers", SPIE Proc. 1591, *Infrared Fiber Optics III.* (1991).] Powerful lasers, such as $CO_2$ lasers, operate within this portion of the electromagnetic spectrum. Thermal sensing of ambient temperatures takes place there; and the majority of the fundamental vibrational and bending frequencies important to molecular spectroscopy are found there.

While the introduction of silver halide based fibers has improved the transmission, the fibers still suffer from high losses from Fresnel reflections at the fiber/air interfaces. The high refractive indices of the silver halides, typically 2.2, cause reflective losses of 14% per air/fiber interface.

In optics, a common approach to reducing Fresnel losses consists of applying antireflective coatings to an optical component's surfaces by sputtering or chemical vapor deposition. Efforts to use these methods to manufacture end surfaces with antireflective coatings on thin mid-infrared optical fibers, however, have been frustrated by numerous difficulties. Among them are: the limited temperature stability of the fibers, e.g. about 300° C. for the silver halides; the high susceptibility to degradation on exposure to ultraviolet light; the softness of the material; the general lack of adhesion to many coating materials; and mismatches in coefficients of thermal expansion with most of the candidate coating materials. As a result mid-IR optical fibers with antireflective coated ends and generally micro optical components for mid-IR transmission with antireflective coated surfaces do not yet exist.

OBJECTS AND SUMMARY OF THE INVENTION

An object of the present invention is to overcome the present difficulties of making mid-IR optical fibers and optical components with antireflective surfaces.

A further object of the present invention is to provide mid-IR optical fibers and other optical components that have antireflective surfaces.

Still a further object of the present invention is to provide a method of making mid-IR optical fibers and other optical components with antireflective surfaces.

Briefly stated, the present invention provides a mid-infrared optical fiber and other micro optical components whose input and/or output surfaces have been made antireflective. In particular, these components can be made substantially non-reflective, thereby eliminating Fresnel reflection losses at their surfaces, by including voids within these surfaces. The volume fraction of voids required to eliminate the Fresnel reflection losses, for example with an optical fiber, $v_1$, is $v_1 = [n_2 - (n_m n_2)^{1/2}]/[n_2 - n_1]$, where $n_1$ is the refractive index of the void, $n_m$ is the refractive index of the medium surrounding the fiber tip, $n_2$ is the refractive index of the optical fiber core material, and $v_2$ is its volume fraction in the modified tip section. The thickness, t, of the layer of lower refractive index material required at the fiber tip is $2N t \cos\theta = \lambda_o/2$, where $\lambda_o$ is the target wavelength for total cancellation by interference, $\theta$ is the angle of incidence, and $N = (n_m n_2)^{1/2}$, where $n_2$, is the refractive index of the core material and $n_m$ is the refractive index of the medium in contact with the fiber end.

According to an embodiment of the invention, a mid-infrared micro optical component comprises at least one surface of said component having a structure substantially free of Fresnel losses for at least one transmission wavelength.

According to a feature of the invention, a mid-infrared micro optical component comprises: at least one surface of said component being substantially free of Fresnel losses for at least one transmission wavelength; and said at least one surface having a thickness $t = \lambda_o/(4N \cos\theta)$, where $\lambda_o$ is the target wavelength for total cancellation by interference, $\theta$ is the angle of incidence, and $N = (n_m n_2)^{1/2}$, where $n_2$, is the refractive index of the component material and $n_m$ is the refractive index of the medium in contact with the component surface.

According to another feature of the invention, a method of substantially eliminating Fresnel losses at the surfaces of mid-infrared micro optical components comprises introducing a plurality of voids into said components surfaces.

It is understood that in a typical optical transmission system an optical fiber end surface is in contact with a medium having a generally lower refractive index in the same way a micro lens surface or other micro optical component surface is in contact with a medium having a generally lower refractive index. An optical fiber end surface is thus a good representative micro optical component for this class of objects.

The above, and other objects, features and advantages of the present invention will become apparent from the following description read in conjunction with the accompanying drawings, in which like reference numbers in different drawings designate the same elements.

DETAILED DESCRIPTION OF PREFERRED EMBODIMENTS

Figure 1:
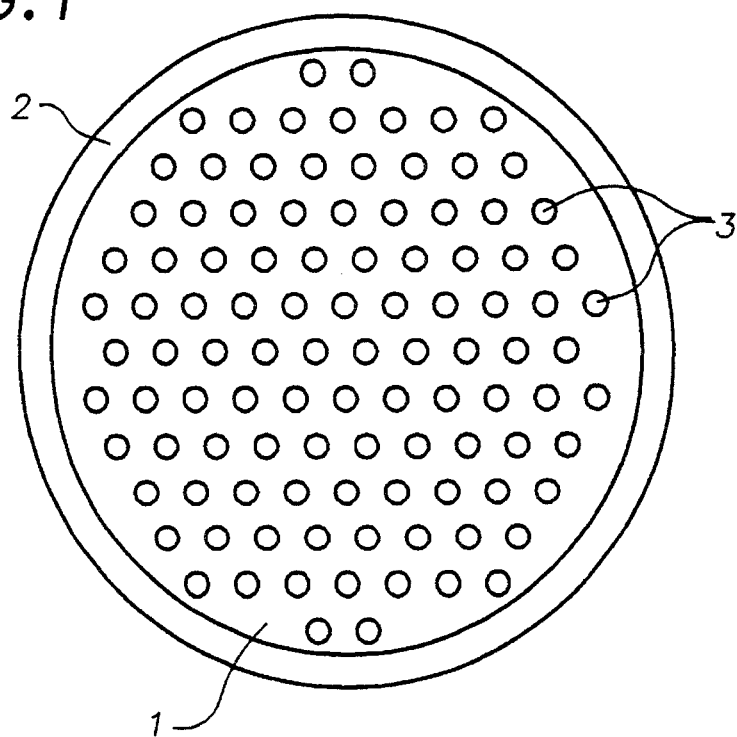
FIG. 1 shows an end view of an optical fiber modified by the introduction of voids according to an embodiment of the present invention.

Physical defects, such as voids, which are significantly smaller than the transmitted wavelength have much different optical effects than their comparatively macroscopic counterparts. For example, the effective refractive index of a material can be reduced by introducing micro voids into it. This principle has recently been used at CeramOptec Industries to develop an all silica optical fiber with both core and cladding made of pure undoped silica.

The effective refractive index, N, of such a composite material can be calculated from the following relationship:

$$N = n_1 v_1 + n_2 v_2 \qquad (1)$$

where $n_1$ is the refractive index of the void, $v_1$ is the volume fraction of the voids, $n_2$ is the refractive index of the optical component material and $v_2$ is its volume fraction in the modified surface section.

To determine the volume fraction of voids needed to eliminate the Fresnel reflection losses, one must derive from the basic equations an expression for v in terms of both the refractive indices of the voids, the optical component material, and the medium interfacing with the component surface, and the minimum Fresnel reflective loss desired.

The Fresnel reflection loss, R, at an air/material interface is given by:

$$R = (1-N)^2/(1+N)^2 \qquad (2)$$

or in general for any medium/material interface the Fresnel loss is given by:

$$R = (n_m - N)^2/(n_m + N)^2 \qquad (3)$$

where N is the refractive index of the material at the interface and $n_m$ is the medium's refractive index.

The criterion for determining the thickness, t, required of the lower refractive index material over the higher refractive index optical component material is given by the formulas:

$$N = (n_m n_2)^{1/2} \qquad (4)$$

where $n_2$ is the refractive index of the component material, and $n_m$ is the refractive index of the medium in contact with the component surface, and by;

$$2N\, t\, \cos\theta = \lambda_o/2 \qquad (5)$$

where $\lambda_o$ is the target wavelength for total cancellation by interference and $\theta$ is the angle of incidence. For orthogonal rays as an example, the required thickness of the layer is, $$t = \lambda_o/4N \qquad (6)$$

Combining (1) with (4), where the medium is air of refractive index 1.0, the void volume, $v_1$, for the optimum effective refractive index of the layer at the component surface is:

$$n_1 v_1 + n_2(1-v_1) = (n_2)^{1/2} \qquad (7)$$

or, $$v_1 = [n_2 - (n_2)^{1/2}]/[n_2 - n_1] \qquad (8)$$

Setting the void refractive index equal to that of air, the void volume becomes, $$v_1 = [n_2 - (n_2)^{1/2}]/[n_2 - 1.0] \qquad (9)$$

In general, with any medium in contact with the component surface and with no assumption whether the voids are filled with the medium or are empty, the void volume fraction is given by:

$$V_1 = [n_2 - (n_m n_2)^{1/2}]/[n_2 - n_1] \qquad (10)$$

To summarize, the inherent Fresnel reflective loss at the interface of the component surface is given, in general, by equation (3). The wavelength, at which the reflective loss is to be minimized, is determined by the light source to be employed. The objects of the invention are achieved by introducing voids into the optical component surface to a depth determined in equation (6), with a volume fraction determined by equation (10) and with the voids having at least one surface dimension smaller than half the selected wavelength. This last criterion is needed to have the impinging light interact with the effective refractive index of the composite surface volume, N. It is an underlying assumption of any evaluation of Fresnel losses.

The following examples illustrate how to employ the above equations with the techniques of introducing voids into fiber tips, as described above for any optical component surface, to obtain the benefits of the invention. One type of mid-IR optical fibers available are silver halide based Optran MIR® fibers [available from CeramOptec Industries, Inc.], which have a refractive index of 2.1. At the MIR/air interface, the Fresnel reflection loss is given by equation (2) as 13%. It is also possible to make such silver halide optical fibers with a cladding over the core of the same material, placing voids within the cladding to make its refractive index lower than that of the modified core.

To eliminate the Fresnel reflection loss at the selected operating wavelength of the system, we calculate from equation (9) the required volume fraction of voids to be introduced into the fiber tip. The result is 0.59 or 59% of voids by volume must be introduced into the tip region to achieve this reduction. The depth of the voids, as determined above is $\lambda_o/5.8$, since the effective refractive index of the layer is 1.45. The person preparing the terminated fiber can employ stamping, cutting or other appropriate means to remove the desired amount of material, in a carefully controlled manner, from the tip. Following this protocol will give the proximal fiber end minimized reflective losses at or near the selected wavelength, $\lambda_o$.

The distal end of the fiber is likely to be immersed in a fluid with a refractive index similar to water, i.e. n=1.33. To eliminate the reflection loss at this interface, we apply equation (10). Assuming the voids filled with the liquid medium, the volume fraction of voids to be introduced into the fiber tip is 0.56 or 56%. Assuming that the voids will remain essentially filled with air, because of their small size, the volume fraction of voids to be introduced into the fiber tip becomes only 0.39 or 39%. In either case the depth of the voids to be introduced is $\lambda_o/6.88$, since the effective refractive index of the layer is 1.67.

The methods applied here can be applied to other materials, such as, for example sapphire, or heavy metal fluorides, used for mid-IR optical fibers and to achieve other levels of reduced Fresnel reflection. The present invention can also be used to minimize reflective losses at any fiber/medium interface, including, for example, a fiber immersed in water or in body fluids. In the latter case, initial losses will be smaller than for an air interface. Thus greater reductions in reflective losses can be effected by introducing smaller volumes of voids into the tip of the optical fiber.

The wavelengths in the mid-IR region are large compared to the visible range of the spectrum. Thus properly dimensioned voids are more easily manufactured in mid-IR optical fibers than in optical fibers for use in the visible range.. The softness of the fiber materials, which is a problem for standard techniques, is a benefit for the new process of the present invention. Softness makes it easier to create the void structures by cutting with a grooved blade, etching, casting, or by stamping. As discussed above, FIGS. 1–3 show examples of ends of optical fibers of the present invention.

Referring to FIG. 1, a modified mid-IR fiber end is created by introducing voids 3 into a core 1 of the optical fiber. A cladding 2 can be air or it can be a composition of silver halides with a refractive index that is lower than that of core 1.

Figure 2:
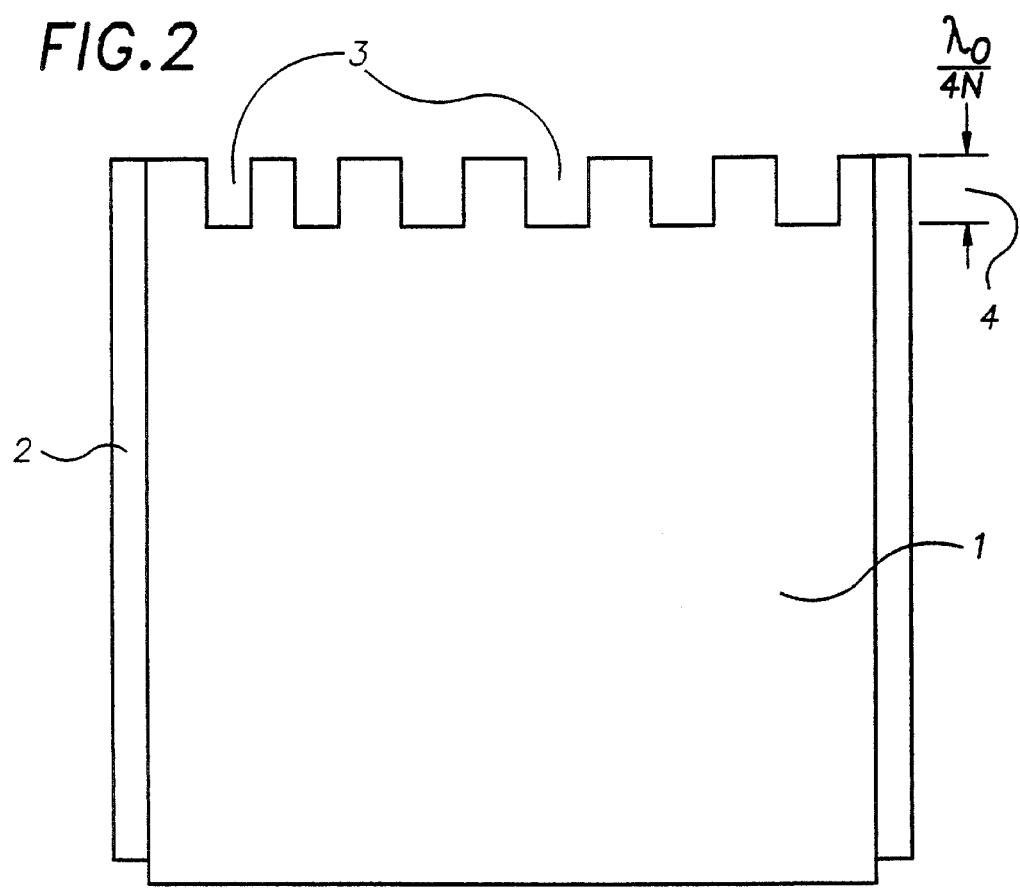
FIG. 2 shows a cross-section of the optical fiber end of FIG. 1.

Referring to FIG. 2, a cross-section of a fiber end shows voids 3 reaching to a depth 4 equal to $\lambda_o/4N$, where $\lambda_o$ is the wavelength at which the reflective loss is to be minimized. N is the effective refractive index of the modified fiber end. Voids 3 are not required to be in a particular alignment. Thus a random cross-section, as depicted here, will show differences in the diameters of voids 3.

Figure 3:
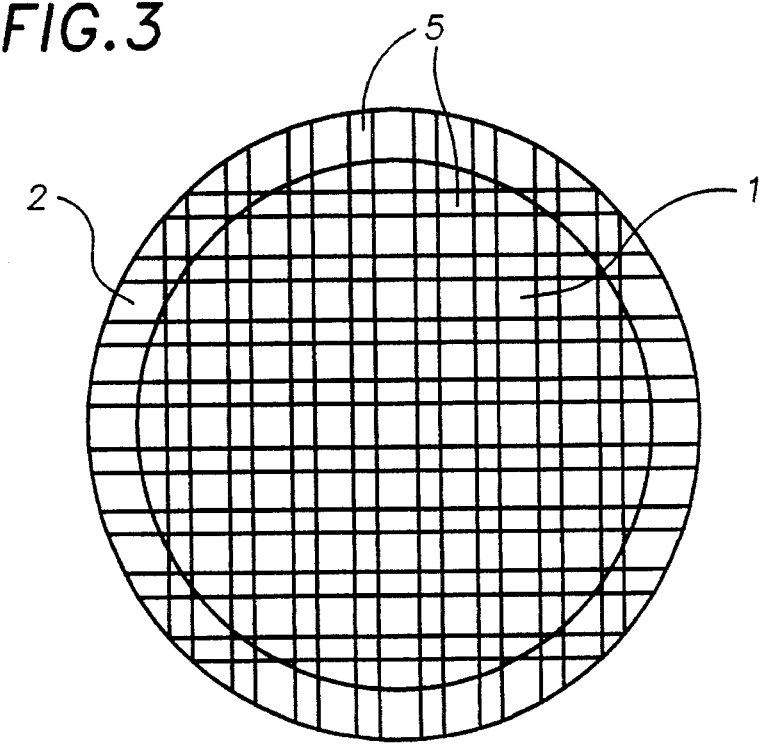
FIG. 3 shows an optical fiber end modified by introducing grooves.

Referring to FIG. 3, in another embodiment of the present invention, grooves 5, are cut or machined to form a crosshatch of lines to a depth of $\lambda_o/4N$ in the modified optical fiber end.

Figure 4:
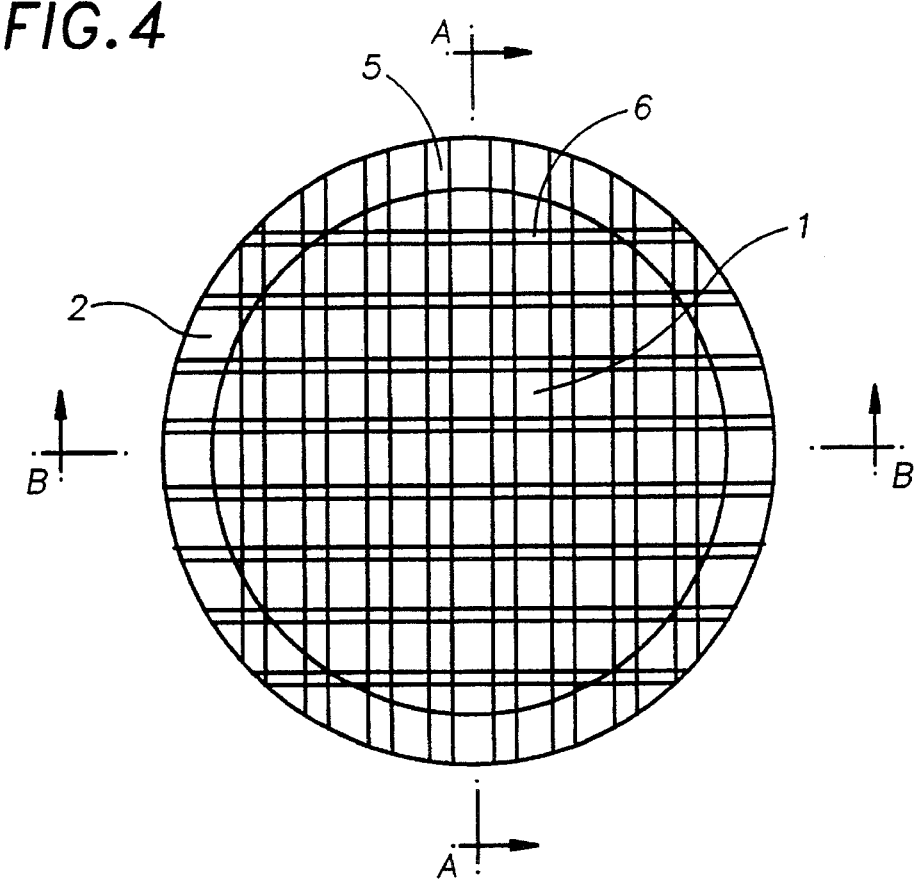
FIG. 4 shows the optical fiber end of FIG. 3 with grooves of different depths.

Referring to FIG. 4, grooves 5 and 6 are cut to different depths and widths, e.g. to depth 4, in one direction and to a depth 7 $(=\lambda_1/4N)$ in another direction in the optical fiber end. Here $\lambda_1$ is a second wavelength at which the reflective loss is to be minimized and $\lambda_1 > \lambda_o$.

Figure 5A:
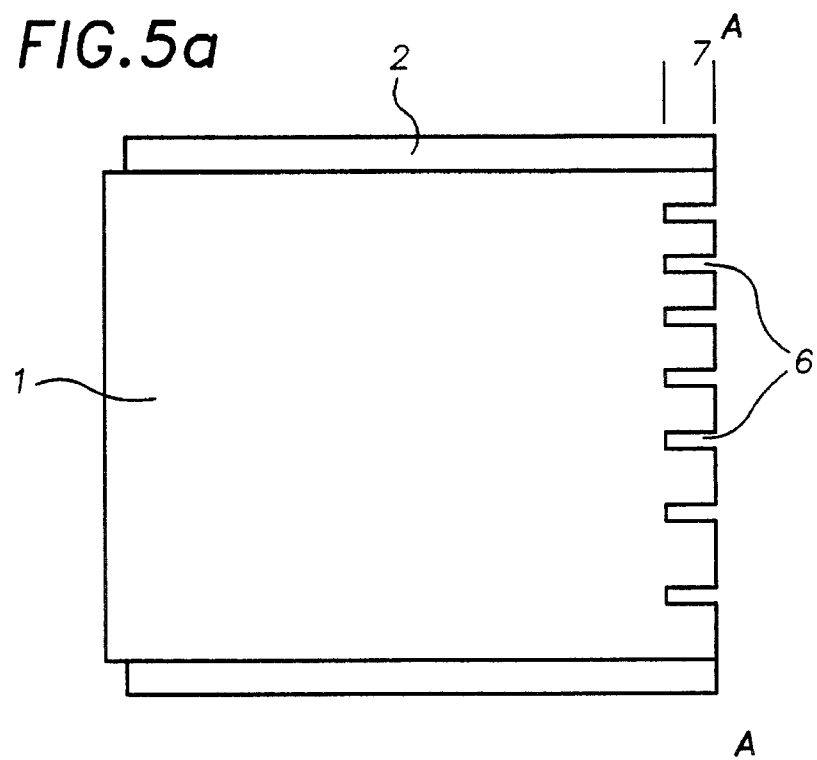
FIGS. 5a and 5b show cross-sections along A—A and B—B of FIG. 4 respectively.
Figure 5B:
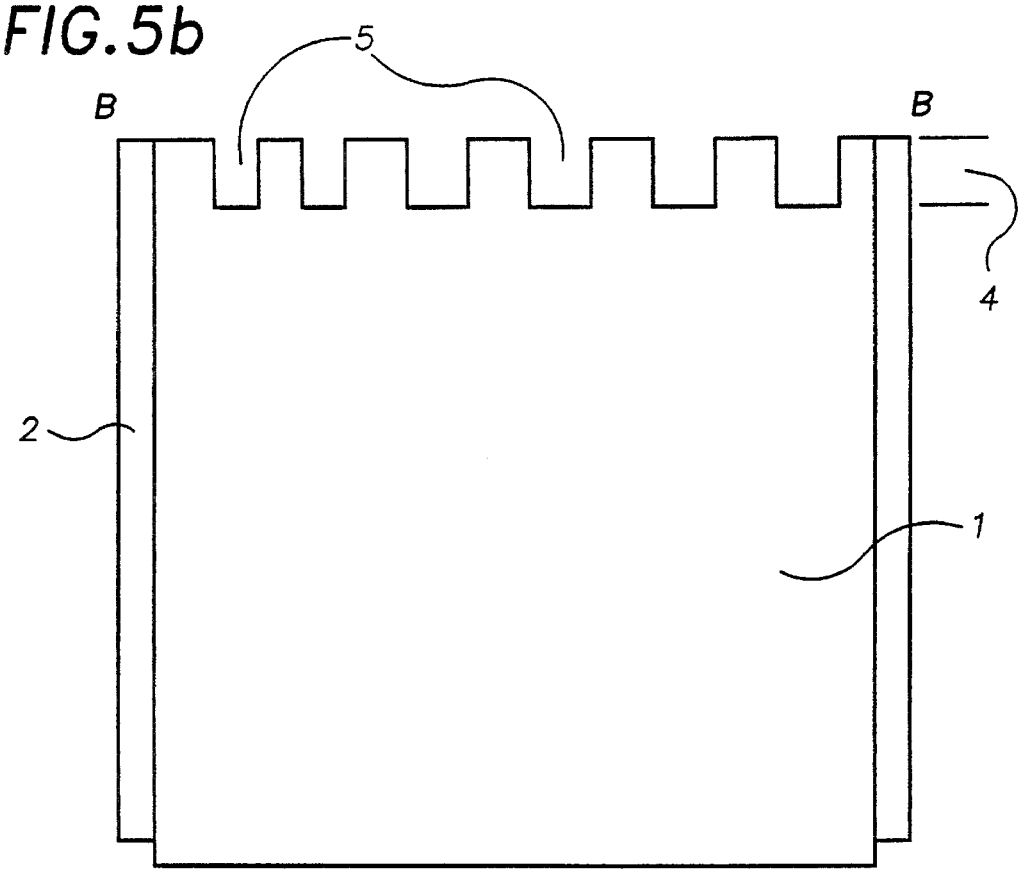

Referring to FIGS. 5a and 5b, cross-sections along A—A and B—B of FIG. 4 show the differences in width between depth 4 and depth 7. The depth and width relationships are selected for two target wavelengths according to the foregoing equations.

In still another embodiment of the present invention, to minimize reflections at a plurality of wavelengths, voids of similar symmetries are placed in the surface with inner areas cut progressively deeper into the fiber end than outer areas. The deeper cuts satisfy the criteria of the above equations for longer wavelengths. The two depths insure that the criteria for minimizing Fresnel reflections are met for at least two wavelengths.

Figure 6:
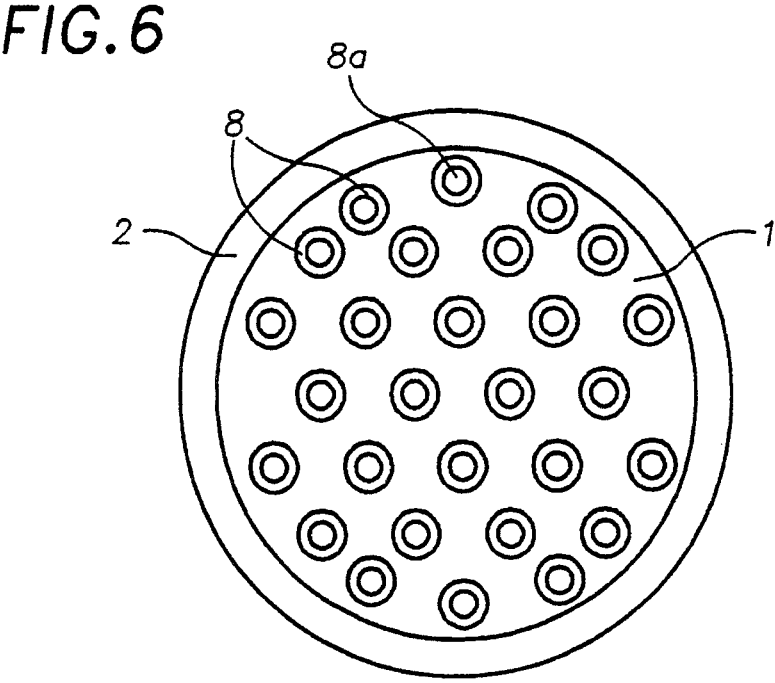
FIG. 6 shows an optical fiber end modified by voids whose centers are cut deeper than the outer circumferences.

Referring to FIG. 6, a plurality of voids 8 in a modified optical fiber end have centers 8a that are cut deeper than their outer circumferences. The deeper centers 8a can be cut by stamping, or other suitable technique, as described below.

Figure 7:
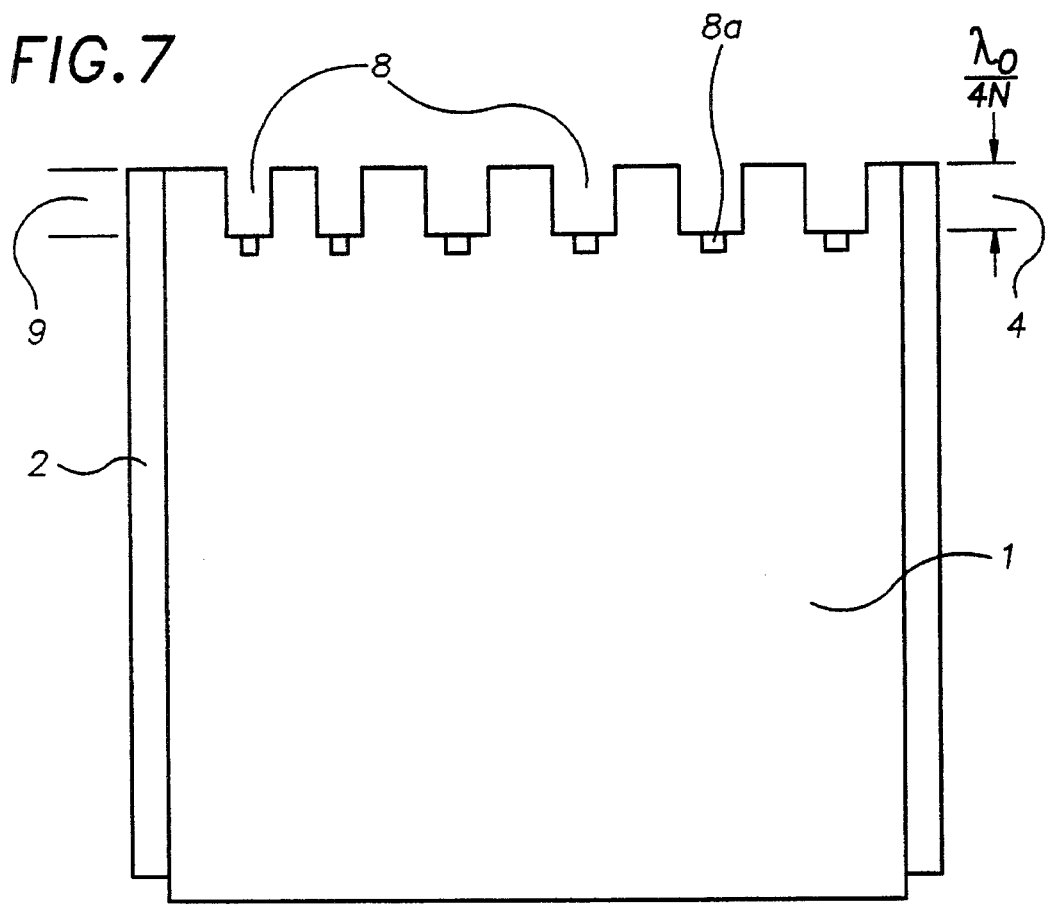
FIG. 7 shows a cross-section of the optical fiber tip end of FIG. 6.

Referring to FIG. 7, the cross-section of the modified optical fiber end of FIG. 6 shows the outer circumference cut to depth 4 given here by $\lambda_o/4N$, while the centers 8a are cut to a depth 9, given here by $\lambda_1/4N$, where $\lambda_1 > \lambda_o$.

Techniques of introducing voids 3 and 8 or grooves 5 and 6 into the tips of mid-IR optical fibers comprise stamping, cutting, sawing, or other micromachining techniques, such as lithography and etching, the ends of the fibers to create the voids or grooves. For example, in a process corresponding to fabrication of the fiber of FIG. 3, each groove 5, in that figure, may include a further groove therein having width and depth parameters corresponding to the circular centers 8a of FIG. 7.

As mentioned earlier these embodiments of the invention as exemplified in detail with optical fiber ends, apply equally well to surfaces of micro lenses. Micro lenses or other micro optical components are understood to be devices whose dimensions in contact with a medium are no greater than a few millimeters.

As an example of another micro optical component, which would benefit from the present invention and thus represents another embodiment, the emitting face of a diode laser is currently coated with a partially antireflecting coating, whose durability presents power limitations on the output from the diode laser. The materials, which compose the matrix of the diode lasers, are of similar physical and chemical nature to the MIR materials described earlier. In fact as pure materials, some are used as optical fiber materials in some applications. Their refractive indices are high and the materials are soft, having typically moderately low softening and melting temperatures. Applying the concepts of the invention to them, a partially antireflective emitting surface with superior characteristics and durability should be achievable. By micromachining voids of proper dimensions and distribution rather than having to introduce a new material to the surface, the antireflective behavior of the surface will be easier to tailor to system design needs, providing higher output powers, and the antireflective surface should also be more durable because of the simplicity of surface in contrast to the current art.

One skilled in the art will recognize that the teaching of the present invention is not limited to use in a specific wavelength radiation band. For example, the techniques of the present invention may be used in shorter-wavelength optical regions, such as visible or near-IR wavelengths, or in longer-wavelength electromagnetic regions such as radar wavelengths, if the substrate material of the optical component has similar mechanical and thermal properties to those of the mid-IR materials described herein. The scope and spirit of the present invention should be considered to include applications in other wavelength regions.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A micro optical component, whose surface being in contact with a medium is modified to reduce Fresnel reflective losses at an interface between said component surface and said medium, comprising:

an optical component material, with a first refractive index;

a surface of said optical component interfacing with an external medium having a second refractive index being lower than said first refractive index;

said surface having a plurality of depressions and an effective refractive index lower than said first refractive index; and at least a substantial number of said plurality of depressions having a depth and a fractional volume of said surface effective for reducing Fresnel losses of radiation passing through said surface/medium interface at a predetermined wavelength by satisfying relationships $$R=(n_m-N)^2/(n_m+N)^2$$

$$t=\lambda_o/(4N\cos\theta)$$

$$v_1=[n_2-(n_m n_2)^{1/2}]/[n_2-n_1]$$

where R is said Fresnel reflection loss, $\lambda_o$ is said predetermined wavelength for total cancellation by interference, $\theta$ represents a ray's angle of incidence with said surface, t is said depth, $v_1$ is said fractional volume of said depressions within said surface, N is said effective refractive index of the material at the interface, $n_m$ is said medium's refractive index, $n_1$ is the refractive index of material, including air, within said depression, $n_2$ is the refractive index of said optical component material, and where at least one dimension of said depression within said surface's plane is not greater than half said predetermined wavelength.

2. A micro optical component according to claim 1, wherein:

a remainder of said plurality of depressions have a second depth, different from said depth, effective for reducing Fresnel losses of radiation in passing between said surface/medium interface at a second predetermined wavelength, $\lambda_1$, by additionally satisfying:

$$t=\lambda_1/(4N\cos\theta)$$

where $\lambda_1 > \lambda_0$.

3. A micro optical component according to claim 1, wherein said micro optical component is a micro lens.

4. A micro optical component according to claim 2, wherein said micro optical component is a micro lens.

5. A micro optical component according to claim 1, wherein said micro optical component is an emitting surface of a laser diode.

6. A micro optical component according to claim 1, wherein said micro optical component is an optical fiber; said optical component material is an optical fiber core having a refractive index; and said optical component surface interfacing with said medium is an end of said optical fiber.

7. A micro optical component according to claim 2, wherein said micro optical component is an optical fiber; said optical component material is an optical fiber core having a refractive index; and said optical component surface interfacing with said medium is an end of said optical fiber.

8. An optical fiber according to claim 6, wherein:

said predetermined wavelength is a mid-range IR wavelength; and said fiber core consists of essentially a material selected from the group; silver halides, chalcogenides and heavy metal fluorides.

9. An optical fiber according to claim 8, further comprising a cladding on said core wherein said cladding has a refractive index lower than that of said core.

10. An optical fiber according to claim 6, wherein:

said fiber core consists essentially of polycrystalline silver halides;

further comprising a cladding on said core; and said cladding being a polycrystalline silver halide such that said cladding has a lower refractive index than that of said core.

11. An optical fiber according to claim 6, further comprising a second fiber end interfacing with a medium wherein said second fiber end is modified as said fiber end so as to minimize Fresnel reflections at said predetermined wavelength at said second fiber end interface with said medium.

12. A method of essentially eliminating Fresnel losses at a predetermined wavelength at a surface of a micro optical component, having a refractive index and interfacing with an external medium having a refractive index lower than said refractive index, comprising:

introducing a plurality of depressions in said surface; and a step of distributing said depressions, as they are introduced, with a volume fraction and a depth effective for substantially eliminating reflective Fresnel losses at said predetermined wavelength, such that said surface modified by said depressions satisfies relationships:

$$R=(n_m-N)^2/(n_m+N)^2$$

$$t=\lambda_o/(4N\cos\theta)$$

$$v_1=[n_2-(n_m n_2)^{1/2}]/[n_2-n_1]$$

where R is said Fresnel reflection loss, $\lambda_o$ is said predetermined wavelength for total cancellation by interference, $\theta$ represents a ray's angle of incidence with said surface, t is said depth, $v_1$ is said fractional volume of said depressions within said surface, N is an effective refractive index of material at said interface, $n_m$ is said medium's refractive index, $n_1$ is the refractive index of material, including air, within said depression, $n_2$ is the refractive index of said optical component material, and where at least one dimension of said depression within said surface's plane is not greater than half said predetermined wavelength.

13. A method according to claim 12, wherein said step of introducing is selected from a group of micromachining techniques comprising: stamping, cutting, sawing, lithography or etching.

14. A method according to claim 12, wherein said step of introducing includes forming generally cylindrical depressions in said surface.

15. A method according to claim 12, wherein said step of introducing includes forming a cross-hatch pattern of linear cuts in said surface.

16. A method according to claim 12 further comprising eliminating Fresnel losses at a second predetermined wavelength, $\lambda_1$, by introducing and distributing a second set of depressions, said depressions satisfying;

$$t=\lambda_1/(4N\cos\theta)$$

where $\lambda_1 > \lambda_0$.

* * * * *